Figure 1:
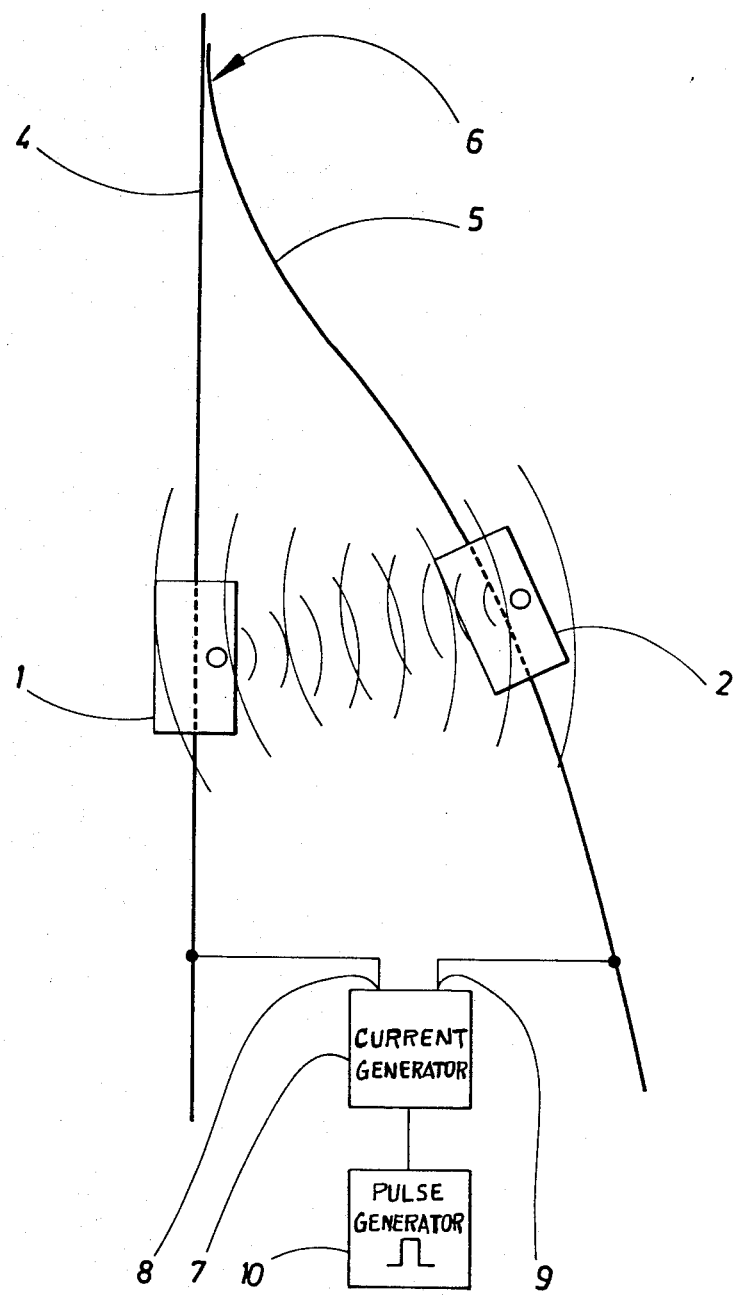

United States Patent [19]

Nilsson

[11] Patent Number: 4,524,931
[45] Date of Patent: Jun. 25, 1985

[54] DEVICE FOR INDICATING A CERTAIN PROXIMITY BETWEEN MOVABLE UNITS

[75] Inventor: Arne H. A. Nilsson, Kungsbacka, Sweden

[73] Assignee: Ingeniorsfirma N.D.C. Netzler & Dahlgren Co Aktiebolag, Saro, Sweden

[21] Appl. No.: 319,635

[22] Filed: Nov. 9, 1981

[30] Foreign Application Priority Data

Nov. 12, 1980 [SE] Sweden .............................. 8007933

[51] Int. Cl.³ .................... B61L 3/00; B61L 1/08; G01S 3/02
[52] U.S. Cl. ..................... 246/167 D; 246/63 R; 246/167 R; 104/299; 343/458; 367/128
[58] Field of Search .......... 246/167 M, 167 R, 167 D, 246/63 R, 63 C, 182 B; 367/909, 128; 180/167, 168; 104/299–301; 377/24; 343/458

[56] References Cited

U.S. PATENT DOCUMENTS

| | | | |
|---|---|---|---|
| 2,698,377 | 12/1954 | Korman | 246/63 C |
| 2,716,186 | 8/1955 | Ford | 246/63 C |
| 3,377,587 | 4/1968 | Nakahara et al. | 246/167 D |
| 3,588,494 | 6/1971 | Mertens | 246/63 C |
| 3,796,864 | 3/1974 | Sampey | 246/167 D |
| 3,892,483 | 7/1975 | Saufferer | 340/34 |
| 3,895,584 | 7/1975 | Paddison | 246/63 R |
| 3,941,201 | 3/1976 | Hermann et al. | 246/167 R |
| 4,055,830 | 10/1977 | Wilson | 343/458 |
| 4,313,183 | 1/1982 | Saylors | 343/458 |

FOREIGN PATENT DOCUMENTS 72084   6/1977   Japan ........................... 246/167 R

*Primary Examiner*—James J. Groody

[57] ABSTRACT

A device for indicating a certain proximity between movable units emitting to the units a synchronizing signal with a very high transmission speed. A transmitter device is situated at least on certain of the units. The transmitter device is activated by the synchronizing pulse to emit an information signal in the form of a wave propagation movement in the medium in which the units are located. The wave propagation movement has in comparison with the synchronizing signal a considerably lower transmission speed. In at least certain others of the units the information signal is received by and related to the difference in time between the synchronizing signal and the received information signal to a predetermined time value corresponding to a certain proximity between the units. Thereafter the difference in time is evaluated in relation to the predetermined time value.

3 Claims, 4 Drawing Figures

DEVICE FOR INDICATING A CERTAIN PROXIMITY BETWEEN MOVABLE UNITS

The present invention relates to a device for indicating a certain proximity between movable units.

In order to avoid a mutual collosion between movable units or between movable and fixed units, which can come into inadmissible proximity to one another, automatic safety devices have been developed in certain fields, which indicate a certain proximity between the movable units. There are several different solutions, for example, for loop-controlled vehicles which are intended to follow a path predetermined by a control loop. Common to these is the fact that the vehicle in a certain path is given priority over a vehicle in another adjacent path, as a result of the fact that the last-mentioned vehicle is automatically stopped. This has previously been solved, for example, by the fact that sensing loops are placed out in the two paths in front of each point of conflict and when two vehicles approach this point, each on its own path, it is decided locally at the actual point of conflict or centrally, which vehicle shall be given priority, whereupon the other vehicle is stopped. Another known solution utilizes radio communication between a fixed, locally situated installation and the vehicles, to stop the one vehicle when a conflict situation arises. Common to all the previously known solutions is the fact that these require both a fixed and a movable installation, which makes these solutions expensive.

The main object of the present invention is to develop a simple device with which the installation work and associated costs can be kept low, while at the same time a reliable and unambiguous indication of inadmissible proximity is obtained between different units.

Said object is achieved by means of a device according to the present invention which is characterized in that included in the device is a device to emit to said units a synchronizing signal with a very high transmission speed, a transmitter device situated at least at certain of said units to be activated by the synchronizing signal to emit an information signal in the form of a wave propagation movement in the medium in which the units are located, with a considerably lower transmission speed in comparison with the synchronizing signal, devices situated at least at certain others of said units, to receive the information signal, to relate the difference in time between the synchronizing signal and the information signal received to a predetermined time value corresponding to a certain proxmity between the units and to evaluate said difference in time in relation to the predetermined time value.

Figure 2:
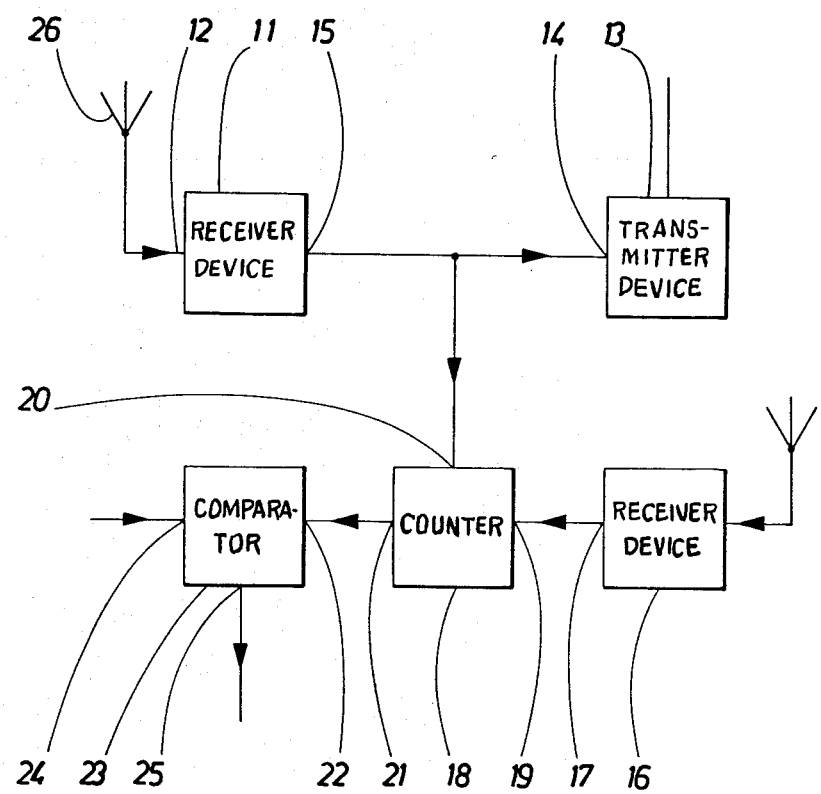
Figure 3:
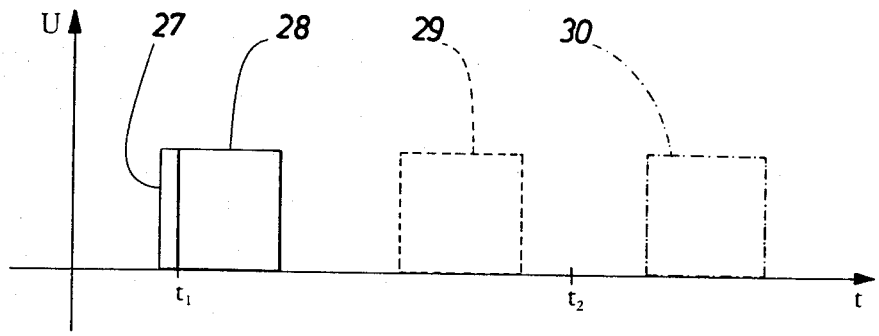
Figure 4:
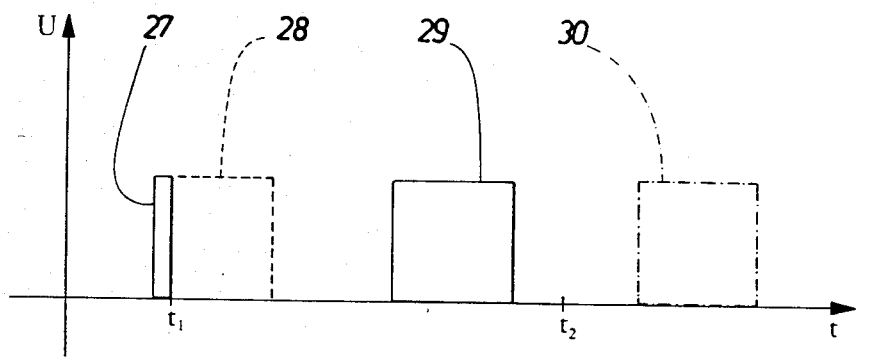

The invention will be described in more detail below of an embodiment with reference to the accompanying drawings, in which:

FIG. 1 shows diagrammatically a portion of a transport installation with loop-controlled vehicles, FIG. 2 is a block diagram of the main part of the device according to the invention, while FIGS. 3 and 4 illustrate the principle of the present invention in diagrammatic form.

The example illustrated in the drawings relates primarily to an installation fo loop-controlled vehicles where at least two movable units in the form of vehicles 1, 2 are adapted to travel along tracks 4, 5, the extent of which is determined by magnetic loops which are generally placed in the support on which the vehicles travel. A prerequisite for the present invention in the actual example is that the tracks 4, 5 comprise two parts which come into conflict with one another at a conflict point 6. Furthermore, the one track portion 4 is of such a character that the vhicle 1 which is travelling along this track portion is given priority over the vehicle 2 which is travelling along the other track portion 5. Hereinafter, the one track portion 4 is called the main track and the other track portion 5 the side track which is intended to join the main track at the conflict point 6.

In the example shown, the vehicles 1, 2 are driverless and comprise, in conventional manner, a drive device and a control device by means of which the trucks automatically following the associated magnetic loop. In the present example, this loop is divided into separate component loops which are electrically insulated from one another, one for each track portion, and they are fed individually from a current generator 7 which comprises two outputs 8, 9. At each of these, an alternating current is delivered with a frequency in the range of 1.2 kHz for example. The two component loops are fed with alternating current at mutually different frequencies to render it possible to detect, in each vehicle, whether it is on the track with priority or not. Different frequencies are also required to avoid extinction of the magnetic field between the two loop portions at the conflict point 6, which would result in a faulty control of the vehicles.

The object of the device according to the present invention is to prevent a collision between two vehicles 1, 2 which are approaching the conflict point 6 on the main track 4 and the side track 5 respectively. For this purpose, a decision must be reached as to which vehicle on which track it is to be given priority over the other vehicle on the other track. In the present case, priority has been given to the vehicle 1 on the main track 4. Further required is detection of a certain proximity between the two vehicles 1, 2 and action on the one vehicle 2, in this case the vehicle on the side track 5, that is to say without priority, so that the vehicle stops or is braked when such proximity occurs, as a result of which a collision is avoided.

For this purpose, the device according to the invention comprises a synchronizing pulse generator 10 which is connected to the current generator 7 to emit a synchronizing signal to the two component loops. The synchronizing signal consists of synchronizing pulses which are emitted, for example, at a pulse repetition frequency of 0.5–1 Hz. The synchronizing signal may, for example, be superimposed on the alternating current in the magnetic loop or be emitted in series in time with this alternating current so that the alternating current is interrupted briefly at certain intervals during the transmission of the synchronising signal. In the example shown, the synchronizing pulse generator 10 consists of a simple fixed installation which may appropriately be integrated with the rest of the central installation, which is necessary for the operation of the installation as a whole.

Included as a main part in the device according to the invention is an equipment which is related to each vehicle 1, 2 and which thus accompanies the vehicle. This equipment is provided with a receiver device 11 with an input 12 for wireless reception via an aerial 26 of the synchronizing signal transmitted via the magnetic loops. Also included is a transmitter device 13 with an input 14 to receive the synchronizing signal from the output 15 of the receiver device 11. In the example shown, the transmitter device 13 consists of an ultrasonic transmitter and is thus adapted to emit an information signal, in this example hereinafter called the warning signal, which has a considerably lower speed of propagation in comparison with the speed of propagation of the synchronizing signal. Also included in said equipment accompanying each vehicle is a receiver device 16 for the warning signal. Thus, in the example shown, the receiver device consists of an ultrasonic receiver which comprises an output 17 which is connected to the stop input 19 of a counter 18. Connected to the start input 20 of the counter is the output 15 from the receiver 11 of the synchronizing signal. The counter 18 is further connected, at its output side 21, to the input side 22 of a comparator 23. A preset comparative value is fed into a further input 24 of the comparator. Under certain conditions, an indicating signal to indicate a certain proximity between the vehicles appears at an output 25 from the comparator 23. The output 25 can be coupled to a circuit, not shown, to stop the vehicle or reduce its speed.

When the installation is in operation, synchronizing signals are transmitted continuously via the magnetic loops in the form of synchronizing pulses with a certain pulse repetition frequency. These are received by the receiver devices 11 of all the vehicles 1, 2, at their inputs 12. The synchronizing signal is transmitted from the magnetic loop via the magnetic field extending around this loop, which is sensed by the aerial 26 of the receiver device 11. In the diagram shown in FIGS. 3 and 4, a synchronizing pulse 27 is shown which is received in each vehicle 1, 2. Each synchronizing pulse is detected in the receiver device 11 and emitted at its output 5, and is fed on the one hand to the input 14 of the ultrasonic transmitter 13 and on the other hand to the start input 20 of the counter 18. At this, the counter 18 is started and for each synchronizing pulse 27, a warning signal 28 is emitted from the ultrasonic transmitter 13 in the form of an ultrasonic pulse, which is indicated by a full line in FIG. 3, which represents the warning signal emitted from the one vehicle 1 and is indicated by a broken line in FIG. 4 which represents the warning signal emitted from the other vehicle 2.

During the travel of the vehicles along the tracks of the installation, warning signals are thus transmitted continuously with intervals of time which are determined by the pulse repetition frequency of the synchronizing signal 27. For example, the interval of time in the present application may be in the range 200–500 ms. With the use of ultrasonics, the warning signal is in the range of 40–100 kHz. Thus the warning signal is emitted from all the vehicles using the air as a transmission medium, that is to say with a speed of propagation of about 340 m/s. With a vehicle speed of 1 m/s a warning signal is emitted about every 0.5 m. The speed of propagation or speed of travel of the synchronizing signal is of the order of magnitude of the speed of light, that is to say $3 \times 10^8$ m/s, and is thus practically "infinitely great" in comparison with the speed of propagation of the warning signal. Each synchronizing pulse 27, in relation to the interval of time between the pulses and the speed of propagation of the warning signals, can be regarded as reaching all the trucks 1, 2 practically simultaneously. The theoretical difference in time which occurs can thus be ignored in this connection.

The transmitted warning signals from each vehicle 1, 2 are received by the other vehicles in the ultrasonic receivers 16 a certain time after the warning signal has been transmitted from another vehicle. The delay in time can easily be measured because of the relatively low speed of propagation and is proportional to the distance between the transmitting and the receiving vehicle. By measuring this difference in time, it is therefore possible to find out whether two vehicles are in inadmissible proximity to one another, which information is particularly important in front of a conflict point 6 where two vehicles may appear simultaneously with the risk of a collision. When each ultrasonic pulse 29 is received in the ultrasonic receiver 16, a signal is therefore emitted at its output 17 to the stop input 19 of the counter 18. A received ultrasonic pulse is shown by a broken line in FIG. 3 and is designated here by 29 representing the warning signal received in the one vehicle 1, while the corresponding pulse 29 is designated by a full line in FIG. 4 representing the warning signal received in the other vehicle. When the counter 18 is stopped, a counted value appears at its output side 21 and is fed to the comparator 23 at its one input side 22. This counted value is compared with the preset comparative value, whereupon said indicating signal is emitted at the output 25 of the comparator and indicates whether the counted value exceeds or is below the preset value. The preset value actually represents a certain preset interval of time from the moment $t_1$ to the moment $t_2$, which corresponds to a previously selected distance between two vehicles 1, 2. If said counted value is below the preset value, this means that the ultrasonic pulse 29 received appeared within the predetermined interval of time $t_1 - t_2$ and that the two vehicles 1, 2 are within a predetermined distance from one another, for example 3 meters. If the ultrasonic pulse received is received after the moment $t_2$, that is to say outside the predetermined interval of time $t_1 - t_2$, which is illustrated by an ultrasonic pulse in chain lines in FIGS. 3 and 4, which is designated by 30, there is a counted value at the output side 21 of the counter 18 which exceeds the preset counted value, in which case the indicating signal at the output 25 of the comparator 23 is zero, for example, indicating that the vehicles are outside the monitored proximity zone, so that there is no risk of collision, so that the travel of the vehicles should not be interrupted.

Since a collision at the conflict point 6 is avoided by the one vehicle 2 being braked or stopped, while the other vehicle 1 continues up to and past the conflict point, the indicating signal at the output 25 from the comparator 23 is thus used only for vehicles on the one track. Since it has been predetermined, in the example shown, that the vehicle 1 on the main track 4 should be given priority, this vehicle is not acted upon by the indicating signal. This is brought about in a manner not shown as a result of the fact that each vehicle 1, 2 detects whether it is on a track with priority or not at a conflict point. This is brought about, as mentioned above, by detecting the different frequencies on the main track and side track respectively. The vehicle 2, which detected presence on a track without priority at a conflict point 6 and detected a certain nearness to another vehicle, thus receives an indicating signal at the output 25. The signal thus indicates this proximity to another vehicle and activates a circuit to reduce the speed of the vehicle or stop it. This state of the vehicle is maintained until there is no risk of a conflict. This is brought about, for example, as a result of the fact that the activation of the circuit for stopping or reducing the speed of the vehicle ceases, whereupon the vehicle is started again as a result of the fact that feed voltage is supplied to the drive motor of the vehicle, or this takes place after a certain predetermined delay in time which is determined by a timing circuit belonging to said circuit.

According to the present invention, the device is based on the fundamental idea that use is made on the one hand of a synchronizing signal with a very high speed of propagation and on the other hand of a warning signal which is activated by the synchronizing signal and transmitted from at least certain units, and which is transmitted via the medium in which the units are, with a speed of propagation which is so low in comparison with the speed of propagation of the synchronizing signal that at least certain other units, on receiving the warning signal, with reference to the time which elapses for the warning signal to travel between the units, can decide whether these are in a certain proximity and if this exists between the units, an indicating signal indicates this and can be used for indication or to stop one of the units or to reduce the speed of this one unit.

The invention is not restricted to the example of embodiment described above and shown in the drawings but can be varied within the scope of the following patent claims. For example, the synchronizing signal can be transmitted in another way, for example via radio in the form of an electromagnetic wave movement which, like the example described, has a very high speed of propagation. In this case, it is not necessary for the synchronizing signal to be transmitted from a fixed installation but it can be transmitted from certain of the vehicles. The device according to the invention is not restricted to loop-controlled or railbound vehicles but can be used, in principle, as a warning system or information system mutually between other kinds of movable units. Nor is it necessary to have an automatic stop or reduction of speed, which is normally the case with driverless vehicles, but in manned vehicles, the indicating signal can be used to activate an optical or acoustic signal member. Various applications are conceivable for people with defective vision to warn them of various obstacles and dangers. In the example shown, there is no problem in discriminating between received warning signals because of the low signal strength of the preceding signal. In principle, however, a level detection should be effected so that the strongest signal is always detected.

Above, it has been presupposed that all the vehicles transmit and receive warning signals. Nevertheless, the above-mentioned detection of presence on the main track or side track can be used to inhibit the transmission of warning signals from vehicles on the side track and possibly to give vehicles on the main track only a transmitting function. The device can also detect nearness of two vehicles on the same path within a distance determined by the present time interval described above. In this way the detection will exclude vehicles passing along another path beyond said distance.

I claim:

1. An apparatus for indicating a certain proximity between movable vehicles having a control device assuring that the vehicles automatically follow a predetermined path determined by electrical control loops fed with an alternating current, said apparatus comprising a device for transmitting by means of said electrical control loops to said vehicles an electro-magnetic synchronizing signal in the form of synchronizing pulses propagated with very high speed, a first receiver device, and a transmitter device, situated on each of said vehicles for receiving the synchronizing pulses and for activating said transmitter devices to emit an information signal in the form of wave propagation movement in the air with a considerably lower speed of propagation in comparison with the synchronizing signal, said information signal being in the form of information pulses emitted in synchronism with the reception of the synchronizing pulses, devices situated on each of said vehicles, including a second receiver for receiving the information pulses, means for measuring a time difference arising between the synchronizing pulses as received by a vehicle and the received information pulses emitted synchronously from another vehicle, means for comparing said time difference with a predetermined time value corresponding to a certain proximity between the vehicles, and means for emitting a proximity indicating signal, when said time difference falls below said time value, thereby indicating that the distance between two vehicles lies below a predetermined distance value, said synchronizing pulses reaching all vehicles substantially simultaneously, resulting in that all vehicles transmit during their travel along the path information signals substantially in synchronism with each other and that said proximity indicating signal is caused to be emitted in each individual vehicle, as soon as the same comes within said certain proximity of any other vehicle.

2. An apparatus as claimed in claim 1, for vehicles following at least two tracks which join or cross one another at least at one conflict point, said tracks comprising at least one main track on which vehicles have priority over vehicles on a side track which joins or crosses the main track, and means for braking or stopping the vehicle which is travelling on said side track upon emission of said indicating signal.

3. An apparatus as claimed in claim 1, wherein each vehicle has a transmitter device, and a receiver device for the information signals, a counter adapted to be started by the synchronizing signal and to be stopped on reception of the information signal, and so measure said difference in time which is represented by a counted value, and a comparator from comparing the counted value of the counter with the predetermined time value and for emitting the indicating signal at its output.

* * * * *